Jan. 26, 1971   A. SCHIMMER   3,559,035
MEANS FOR FEEDING A CONSUMING DEVICE WITH DIRECT CURRENT
FROM AN ALTERNATING SOURCE
Filed Nov. 22, 1968
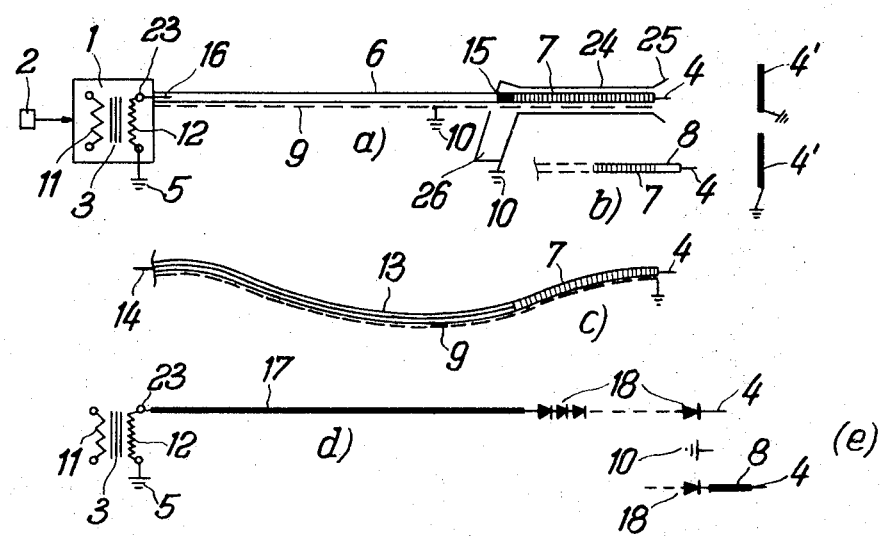
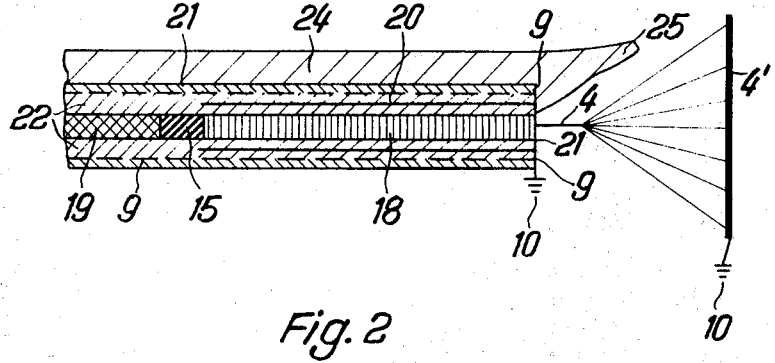

United States Patent Office

3,559,035
Patented Jan. 26, 1971

---

3,559,035
MEANS FOR FEEDING A CONSUMING DEVICE WITH DIRECT CURRENT FROM AN ALTERNATING SOURCE
Armin Schimmer, 1 Nobelstr., 899 Lindau (Bodensee), Germany
Filed Nov. 22, 1968, Ser. No. 778,113
Claims priority, application Germany, Nov. 24, 1967, P 16 38 861.7
Int. Cl. H02m 7/00
U.S. Cl. 321—8    9 Claims

ABSTRACT OF THE DISCLOSURE

A device for safely providing direct current from an alternating current source, wherein between the output of the alternating current source and the input of a D.C. consuming device there is an elongated body which is formed as an elongated resistor member connected to the alternating source, followed by a rectifier member between the resistor and the consuming device.

---

The invention concerns means for feeding a consuming device with direct current from an alternating current source, such as is used to feed high tension devices which require direct current.

Devices are already known which enable a consuming device to be fed with direct current from a source of alternating current. Such devices may use a direct current generator which is supplied from the mains with alternating current, in which the alternating current is transformed up and then subsequently the voltage cascade doubled. The current is subsequently supplied to the consuming device by cable.

Devices are also known in which between an attenuating resistor is arranged the high tension generator, which in this case generates direct current, and the consuming device, the alternator being accommodated in the feeder cable at its entry end, with a terminal adjacent to the resistor. This device is used in radiology, measuring technique and electrostatic filters.

For this purpose liquid cables have already been proposed which are formed as resistors. Cables, however, have also been proposed as solid resistors e.g. in the form of semi-conductors made of plastics material such as P.V.C. or the like. In practice high-resistance cords are also known, formed as wire resistances which also act as lead-in wires.

It is frequently necessary in practice to supply a direct current from a direct current generator to a user device via a cable with the condition that in the event of a short-circuit occurring at the end of the lead-in wire, as little as possible energy is available so as to avoid sparking. For this purpose proposals have already been made to incorporate an attenuation resistance at any point of the lead-in wire, or to provide at the output of the feeder cable a high value attenuating resistance of the other section of the lead-in wire being formed as a normal conducting cable.

Furthermore it has also been proposed to form the input sections of the feeder cable to the device which is to be supplied with direct current of as low an inherent capacitance as possible. Here, a short-circuit causes only a small spark since only a small capacitor is discharged, this being composed of the cable capacity and the minor capacities of the terminal and the other metal members.

A frequent problem in practice is to transfer a direct current energy from a generator to a consuming device which requires only a very low current strength, in which the losses between the generator and the device should remain as low as possible, though a short-circuit spark must remain small. At the device a constant high voltage may be required only to produce an electrostatic field and to supply any leakage, this involving currents which lie in the region of 1 to 5 microamps. A short-circuit or a reduction of gap spacing should cause only a small capacitor discharge, and produce only a small increase in output from the generator.

This problem arises especially in electrostatic paint spray plants, flocking plants, video-frequency amplifiers, ionising plants, electrostatic filters or the like.

The object of the invention is to provide a low loss and short-circuit-proof transfer means for feeding a consuming device with direct current from an alternating current source, in which such current-regulation is effected with a minimum of components. Thus during a short-circuit at the consuming device only quite a low value of energy is available from the capacity of the transfer components. Preferably substantially no sparking should occur. A further object is that in the event of a short-circuit occurring only a small increase in generator output occurs.

A further object of the invention is to place the necessary circuit components in a feeder cable between the alternating current generator and the consuming device.

According to the present invention there is provided a device for safely providing direct current from an alternating current source, wherein between the output of the alternating current source and the input of a D.C. consuming device there is an elongated body which is formed as an elongated resistor member connected to the alternating source, followed by a rectifier member between the resistor and the consuming device.

The method of construction according to the invention has the advantage that, when a short-circuit occurs at the device end, substantially no energy is fed from the capacity of the transfer components and none at all from the generator member. With suitable dimensioning, substantially no transfer spark occurs.

The elongated body may be formed as a hollow body in the form of a cable. As a cable it may also be flexible, or formed as a solid-walled body.

Alternatively the elongated body may be tubular, of plastics material or glass.

The resistor section is of such a value as to produce a required attenuation; it may have a resistance of the value of from 1–10,000 megohms. The body may be of any required length, say up to 5 metres long. The rectifier assembly may be of a length suitable for the voltage as many amplifier plates or other rectifier elements being stacked one above the other as is required to produce the required direct voltage.

It is possible for the longer section of the body to be formed as the attenuating resistor and the shorter section to comprise the rectifier member.

The resistor section may be made as a tubular liquid resistor and by interposition of a conducting closure plug, rectifier sections may follow in the same tube. This embodiment has advantages from a manufacturing point of view and may be formed as a flexible cable.

The rectifier sections may be placed in an insulating liquid which simultaneously acts as a cooling liquid and transfers the heat from the rectifier plates to the external parts of the tube.

The resistor section may be a solid body such as a wire or a conductive plastics material strip. The resistor section may also be formed as a high-resistance cord.

It is also possible to apply a resistance coating on a plastics material wire or rod, the resistance coating being so formed that it is of spiral form. The spiral may be so fashioned that an increase of the resistance characteristic per unit length occurs linearly from one end to the other, or in any function other than linear.

The resistor section may be formed as a liquid resistor and its characteristic may rise or fall linearly or after a function, with regard to the device. It is so constructed that either different cross-sections are used or that a tubular spiral of uneven pitch is used.

In specific cases it may also be necessary to divide the resistor section into groups and to spread these depending upon the intended use over the length of the member provided.

In one method of construction at least one part of the elongated body may be formed as a coaxial cable as used in telecommunication or high frequency technique.

In this manner a high degree of insulation is obtained which is effective for high frequency alternating current inputs.

The rectifier section may include rectifier pellets strung together, and a column of selenium rectifier plates be used, and subjected to spring pressure. At high voltages the rectifier section is formed of groups of series-stacked rectifier plates subject to spring pressure, each group receiving a separate spring action. In this manner plate pressure becomes more uniform and contact is improved.

It is possible for the rectifier section to be formed as a unitary whole with the resistor section, so as to allow it to be assembled conveniently in a tube.

This also provides the advantage that at the connecting points a high degree of insulation is provided, which is especially important when the connecting member can be contacted by hand.

The connecting unit may be formed so that the rectifier section can be removed from the resistor section, as by a suitable socket coupling device. This enables the device to be adjusted to different voltages or to incorporate attenuating resistors of varying value and length.

The device may be used as a connecting cable between the attenuating source and the consuming device, which has hitherto not been possible.

The apparatus of the invention provides an entirely new device for providing a high voltage D.C. supply from an alternating current source which simultaneously accommodates an attenuating resistor and a rectifier unit.

It is possible to accommodate the rectifier section in an insulating handle, the insulation being devised in accordance with voltage requirements. The other part of the transfer member may be formed as the resistor section.

The rectifier section carries on the end a point electrode or terminal which may have the shape of a short needle. This electrode may also be provided with a protective collar.

The invention is described below with reference to the accompanying drawings, in which:

FIGS. 1a–e are embodiments of the invention showing various alternatives, with circuit diagram, FIG. 2 is an alternative embodiment of the invention, in which there is a potential control layer incorporated in the connecting cable.

In FIG. 1a a schematic view of an embodiment of the invention is shown. An alternating current source 2 supplies a transformer 1 which has a low tension winding 11, a high tension winding 12, and a core 3. At the high tension terminal 23 a terminal 16 is mounted which projects into an elongated body 6, 7. A section 6 is formed as a liquid resistor the elongated body being tubular, with a conducting plug 15 at a suitable point along it. At the other end of the body there is a rectifier 7 which carries a D.C. output terminal 4 at its end.

The elongated body 6, 7 may also have a coating 9 applied to its outside surface which is earthed at 10, a high D.C. potential existing between the terminal 4 and earth.

In the example only one terminal 4 is shown to act as direct current output; this may be located opposite an electrode 4' so that between these two 4 and 4' there is a high D.C. potential. It would be possible, of course for a device such as an X-ray screen, image amplifier or the like to be connected between 4 and 4'. The rectifier member 7 consists of small rectifier plates connected in series. It would be possible for other kinds of rectifiers to be used.

FIG. 1b shows only the delivery end of the elongated body, with the rectifier member 7 detached. A further additional attenuation resistor 8 is here inserted, to one end of which terminal 4 is connected opposite an electrode 4', which is connected to earth.

FIG. 1c shows a cable-like part of an elongated body comprising a resistor member 13 which is formed from a solid resistor 14. This solid resistor 14 is located in the interior of an insulating tube. The resistor terminates at a rectifier section 7.

FIG. 1d is a schematic circuit which shows how the device functions electrically. Current in a primary winding 11 on the transformer 3 excites a high tension winding 12. At terminal 23 a resistor 17 is connected to act as an attenuation resistor; the latter may also be formed as a layer resistor or as a solid resistor in the form of a plastics covered wire. Adjoining this is a rectifier member in the form of photoelectric plates or other rectifier units 18. The device terminates in an output H.T. terminal 4. An intermediate conducting plug may be fitted between the resistor part 17 and the rectifier part 18 as in FIG. 1a. Furthermore as shown by FIG. 1e an additional resistor 8 may be connected between the rectifier and terminal 4.

FIG. 2 shows a further embodiment of the invention, in which the elongated body is a connecting cable comprising a resistor part 19 having a plug 15 inserted therein and which is adjoined by the rectifier part 18. At the output end there is a terminal 4. Embedded in the plastics material 22 enclosing the connecting cable, a potential control layer 20 which forms a capacitor with the earthed electrode 9. The layer may be connected at 21 to the terminal 4. This embodiment may be advantageous under various conditions.

It is of course quite possible to bunch a plurality of conductors so that, when a large space is available, e.g. in a handle with an insulating member which may be up to 50 cm. long, other circuits such as voltage multiplier circuits may be accommodated. It will then be necessary to divide the rectifier part 18 into sections and to connect capacitor layers at suitable points to the sections, the terminal 4 being at the output of the circuit, possibly in the form of a needle.

The invention concerns a half-wave rectifier system.

It is of course quite possible for the arrangement as shown in FIG. 2 to be modified to the arrangements of FIG. 1e, and to provide a further attenuation resistor 8, between terminal 4 and the connecting point 21, so that the capacitor part of the device cannot cause a discharge from terminal 4.

If a liquid resistor is used, the plug 15 may be made of conductive glass or a suitable plastics material e.g. an elastomer which is fluoresced and siliconized and made conductive. This may be used with advantage with currents of a few microamps.

The device may be terminated by an insulating sleeve 24 which is provided with a protective collar 25. Parts 24 and 25 are shown only on one side of the device.

In FIG. 1a the parts 24 and 25 are shown diagrammatically a handle 26 being shown which is earthed at 10. The resistor and rectifier parts may be arranged in reversed sequence in the body, and the rectifier may be located centrally in the body and be enclosed on both sides by resistors.

I claim:

1. An apparatus for supplying high direct voltage to a discharge electrode from an alternating current source, comprising a longitudinally extended member placed between the source of alternating current and the input to the discharge electrode, said member being a single conductor high tension cable, comprising a longitudinal formed resistor member connected at one end to said alternating current source, and a longitudinally formed rectifier member coupled at one end to said discharge electrode and at the other end to the other end of said resistor member.

2. The apparatus of claim 1 wherein the longitudinally extended member is a connecting cable to connect the high direct voltage discharge electrode to a source of alternating current.

3. The apparatus of claim 1 wherein the rectifier member is incorporated in an insulated handle, at the front end of which there is located the high direct voltage discharge electrode.

4. The apparatus of claim 1 wherein the resistor member is a tubular liquid resistor and wherein said longitudinally extended member further includes a conducting plug placed between said liquid resistor and said rectifier member.

5. The apparatus of claim 1 wherein the resistor member is formed with a linearly increasing resistance.

6. The apparatus of claim 1 wherein the longitudinally extended member is formed coaxially.

7. The apparatus of claim 1 wherein the rectifier member is removable from the resistor member.

8. The apparatus of claim 2 wherein the connecting cable has an additional damping resistance between the rectifier member and the high direct voltage discharge electrode.

9. The apparatus of claim 1 wherein the high voltage discharge electrode is a needle electrode.

References Cited

UNITED STATES PATENTS

| | | | |
|---|---|---|---|
| 3,291,894 | 12/1966 | Sampson | 174—52 |
| 3,348,186 | 10/1967 | Rosen | 174—84 |
| 3,409,816 | 11/1968 | Foster | 307—146 |
| 3,454,841 | 7/1969 | Urba et al. | 317—234 |

WILLIAM M. SHOOP, JR., Primary Examiner

U.S. Cl. X.R.

307—146; 321—27, 46; 338—214